(12) United States Patent
Ohtomo et al.

(10) Patent No.: US 7,196,776 B2
(45) Date of Patent: Mar. 27, 2007

(54) DISTANCE-MEASURING SYSTEM

(75) Inventors: Fumio Ohtomo, Tokyo-to (JP); Jun-ichi Kodaira, Tokyo-to (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 183 days.

(21) Appl. No.: 10/837,765

(22) Filed: May 3, 2004

(65) Prior Publication Data
US 2004/0246461 A1    Dec. 9, 2004

(30) Foreign Application Priority Data
May 21, 2003    (JP) .............................. 2003-143738

(51) Int. Cl.
*G01C 5/00*    (2006.01)
(52) U.S. Cl. .................... 356/4.01; 356/4.01; 356/4.02; 356/4.03
(58) Field of Classification Search ................ 356/4.01
See application file for complete search history.

(56) References Cited
U.S. PATENT DOCUMENTS
5,532,813 A * 7/1996 Ohishi et al. .............. 356/5.01
5,703,677 A * 12/1997 Simoncelli et al. ........ 356/4.04
2002/0105631 A1* 8/2002 Nonaka et al. ............ 356/3.14

FOREIGN PATENT DOCUMENTS
JP    2000-088566    3/2000

* cited by examiner

*Primary Examiner*—Thomas H. Tarcza
*Assistant Examiner*—Luke D. Ratcliffe
(74) *Attorney, Agent, or Firm*—Nields & Lemack

(57) ABSTRACT

A distance-measuring system, which comprises a light source unit for emitting a distance-measuring light, a photodetection optical system having a photodetection optical axis, a projecting optical system having a projecting light optical axis and for projecting the distance-measuring light from the light source unit to an object to be measured and for guiding the distance-measuring light reflected from the object to be measured toward the photodetection optical system, and an internal reference optical system for guiding the distance-measuring light from the light source unit to the photodetection optical system as an internal reference light, wherein the light source unit can emit two distance-measuring lights with different spreading angles, and one of the light source unit and the projection optical system has a decentering member for decentering the distance-measuring light with respect to the projecting light optical axis.

8 Claims, 4 Drawing Sheets

DISTANCE-MEASURING SYSTEM

BACKGROUND OF THE INVENTION

The present invention relates to a distance-measuring system for measuring a distance to an object by using a laser beam.

In recent years, a non-prism distance-measuring system, a distance to an object to be measured is measured by directly projecting a laser beam for distance measurement to the object to be measured.

In the non-prism distance-measuring system, a laser beam with a smaller beam diameter is used. By using the laser beam with a smaller beam diameter, the laser beam can be projected to the object to be measured by pinpoint. A measuring position on the object can be clearly defined, and it is possible to measure a crest line or a specific point of the object to be measured.

Because an intensity of the projected laser beam is limited from reasons such as safety, in the non-prism distance measuring system, in which high reflection from the object to be measured cannot be expected, the measured distance is shorter compared with a distance-measuring system using a prism (corner cube).

For this reason, a prism is used as the object to be measured in long-distance measurement. Also, a laser beam having a relatively large beam spreading is used to facilitate collimation and to achieve measurement with high accuracy.

As described above, the beam diameter of the laser beam is small in the non-prism distance-measuring system, and it is difficult to project the laser beam to the prism. Accordingly, this is not suitable for the measurement of long distance by using a prism.

However, it is not very economical to provide a distance-measuring system for long distance using a prism and a non-prism distance-measuring system. In this respect, it is proposed now to have a distance-measuring system, in which it is possible to carry out distance-measurement using a prism and non-prism distance-measurement in a single distance-measuring system.

For instance, a distance-measuring system is proposed as described in JP-A-2000-88566 (FIG. 1, and paragraphs [0029]–[0035]), in which distance-measurement using a prism and distance-measurement on non-prism basis can be carried out by a single distance-measuring system.

Referring to FIG. 6, brief description will be given below.

There are provided a first light source 2 for emitting a visible laser beam 1 and a second light source 4 for emitting an infrared laser beam 3. The visible laser beam 1 and the infrared laser beam 3 are emitted independently from each other. The visible laser beam 1 is a laser beam of parallel luminous fluxes with a small beam diameter, and the infrared laser beam 3 is a divergent laser beam.

The visible laser beam 1 or the infrared laser beam 3 is selected depending upon the object to be measured. For instance, in case an object to be measured 5 is a reflector such as a corner cube, the divergent infrared laser beam 3 is projected. In case the object to be measured 5 is a wall surface of a building, etc., the visible laser beam 1 with a small beam diameter is projected. A reflected light 11 from the object to be measured 5 is received by a detector 8 through an objective lens 6 and a filter 7. Based on a signal from the detector 8, a distance to the object to be measured 5 can be measured by an arithmetic operation unit 12.

The filter 7 transmits only wavelength ranges of the visible laser beam 1 and the infrared laser beam 3. Unnecessary light such as sunlight is cut off to improve detection accuracy of the detector 8 to detect the reflection light 11.

In the conventional system as described above, two light sources are used, and this requires a complicated light emitting unit for controlling the light sources, etc. Also, the visible laser beam 1 and the infrared laser beam 3 are used, and the filter 7 must cope with wavelength ranges of the two laser beams, and this means that higher cost is involved.

SUMMARY OF THE INVENTION

It is an object of the present invention to provide a distance-measuring system, in which it is possible to carry out distance measurement using a prism and non-prism distance measurement, and which contributes to simple designing of the system.

To attain the above object, the present invention provides a distance-measuring system, which comprises a light source unit for emitting a distance-measuring light, a photodetection optical system having a photodetection optical axis, a projecting optical system having a projecting light optical axis and for projecting the distance-measuring light from the light source unit to an object to be measured and for guiding the distance-measuring light reflected from the object to be measured toward the photodetection optical system, and an internal reference optical system for guiding the distance-measuring light from the light source unit to the photodetection optical system as an internal reference light, wherein the light source unit can emit two distance-measuring lights with different spreading angles, and one of the light source unit and the projection optical system has a decentering member for decentering the distance-measuring light with respect to the projecting light optical axis. Also, the present invention provides the distance-measuring system as described above, wherein the photodetection optical system can receive the reflected distance-measuring light decentered in a direction opposite to the projected distance-measuring light. Further, the present invention provides the distance-measuring system as described above, wherein the projecting optical system comprises an optical path deflecting member for deflecting the distance-measuring light toward the direction of the object to be measured and for decentering the distance-measuring light with respect to the projecting light optical axis, wherein the projecting optical system guides the reflected distance-measuring light entering with decentered in the direction opposite to the projected distance-measuring light. Also, the present invention provides the distance-measuring system as described above, wherein the deflecting member is a mask having a hole decentered with respect to the optical axis and decenters the distance-measuring light from the optical axis by allowing the distance-measuring light to pass through the hole. Further, the present invention provides the distance-measuring system as described above, wherein the mask is provided on a distance-measuring optical path with a larger spreading angle. Also, the present invention provides the distance-measuring system as described above, wherein the mask is provided on a common optical path for two distance-measuring lights. Further, the present invention provides the distance-measuring system as described above, wherein the light source unit has a first optical path and a second optical path, the distance-measuring light is projected via the first optical path and the second optical path, the distance-measuring light is projected with a smaller spreading angle via the first optical path, and the distance-measuring light is projected with a larger spreading angle via the second optical path. Also, the present invention provides the distance-measuring system as described above, wherein the light source unit has an optical path switching means, and the optical path switching means selectively guides the distance-measuring light emitted from a light source either to the first optical path or to the second optical path. Further, the present invention provides the distance-measuring system as described above, wherein the light source unit has two light sources each emitting the distance-measuring light, the distance-measuring light emitted from one of the light sources is projected via the first optical path, and the distance-measuring light emitted from the other light source is projected via the second optical path. Also, the present invention provides the distance-measuring system as described above, wherein an optical fiber is arranged on the second optical path, and an end surface of the optical fiber acts as a light source. Further, the present invention provides the distance-measuring system as described above, wherein the optical path switching means is a rhombic prism which is provided so as to span between the first optical path and the second optical path, and optical paths can be switched over by inserting or removing the rhombic prism to or from the first optical path and the second optical path. Also, the present invention provides the distance-measuring system as described above, wherein the two light sources are selectively turned on. Further, the present invention provides the distance-measuring system as described above, wherein the photodetection optical system comprises a doughnut lens for converging the reflected distance-measuring light deviated from the photodetection optical axis to the photodetection optical axis.

BRIEF DESCRIPTION OF THE DRAWINGS

FIG. 3 (A) is a plan view, FIG. 3 (B) is a front view, and FIG. 3 (C) is a side view;

DETAILED DESCRIPTION OF THE PREFERRED EMBODIMENTS

Figure 1:
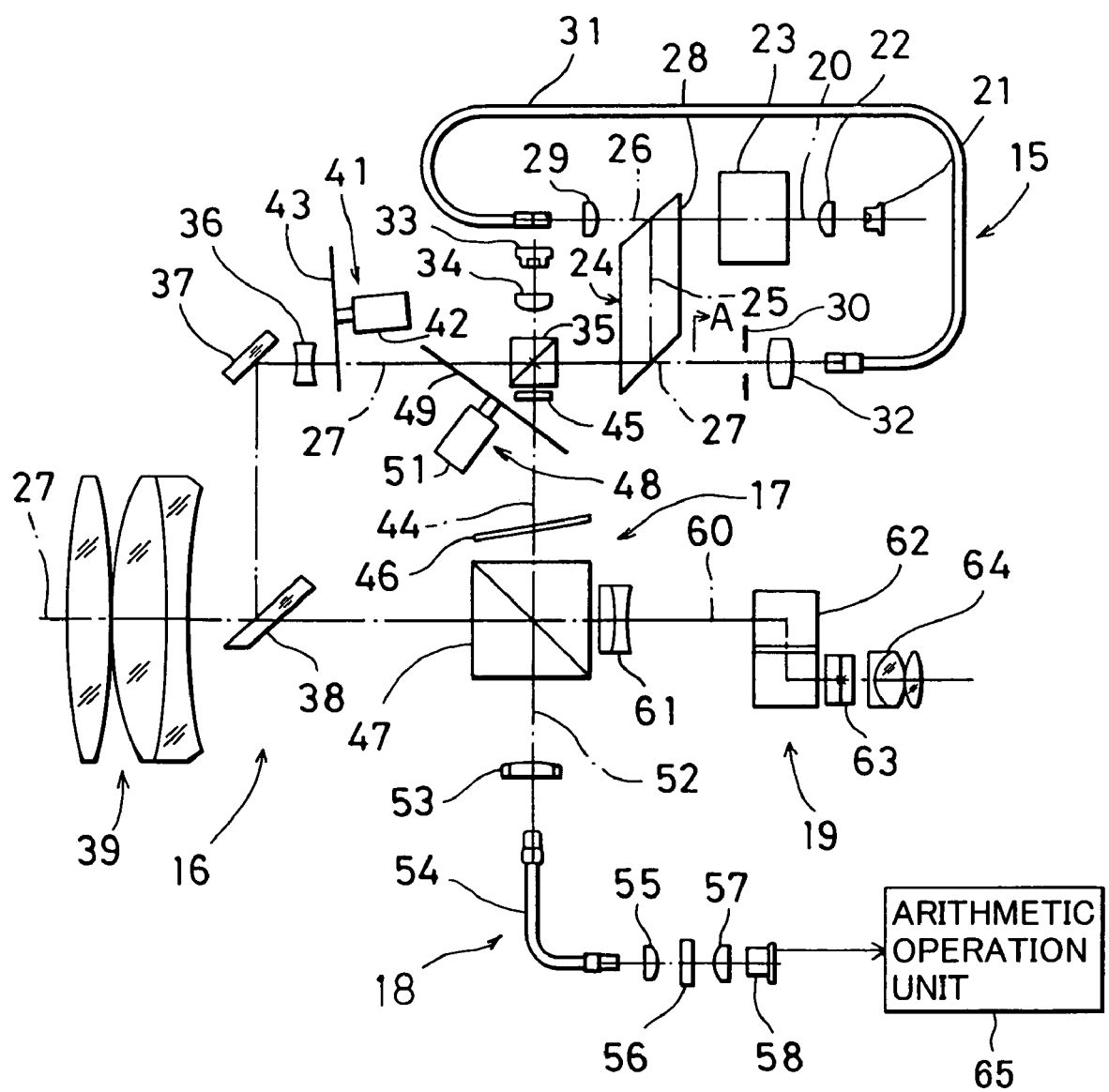
FIG. 1 is a schematical block diagram of a first embodiment of the present invention.

Description will be given below on embodiments of the invention referring to the drawings.

FIG. 1 is a schematical block diagram of a first embodiment according to the present invention. In the figure, reference numeral 15 denotes a light source unit, 16 is a projecting optical system, 17 is an internal reference optical system, 18 is a photodetection optical system, and 19 is an ocular optical system (telescope).

First, description will be given on the light source unit 15.

A laser light source 21 emits an infrared distance-measuring light with a wavelength of 780 nm, for instance. On an optical axis 20 of the laser light source 21, there are provided a first collimator lens 22, a mixing means 23, and an optical path switching means 24.

As the mixing means 23 as described above, means disclosed in JP-A-2002-196076 is used, for instance.

The mixing means 23 described in JP-A-2002-196076 has a pair of gradient index lenses provided on the optical axis and a phase plate placed between the gradient index lenses to shut off the optical path so that the phase plate can be rotated. The phase plate has projections and recesses formed on a checkerboard pattern. The projections and recesses are designed in such manner that there occurs phase difference of $\pi/2$ of the wavelength of the laser beam.

The optical path switching means 24 can select a first optical path 25 or a second optical path 26. It is designed that the first optical path 25 and the second optical path 26 are aligned with a projecting light optical axis 27 by the optical switching means 24.

In the optical path switching means 24, a rhombic prism 28 is rotatably supported, for instance, when the first optical path 25 is selected, a distance-measuring light from the laser light source 21 passes through the mixing means 23 and enters the rhombic prism 28. Then, the distance-measuring light is reflected twice by the rhombic prism 28 and is aligned with the projecting light optical axis 27 while it is running in parallel to the optical axis 20.

The second optical path 26 is aligned with an extension of the optical axis 20. On the second optical path 26, there are provided a second collimator lens 29 and an optical fiber 31. A third collimator lens 32 is arranged at an exit end of the optical fiber 31, and an optical axis of the third collimator lens 32 is aligned with the projecting light optical axis 27. A mask 30 is arranged between the rhombic prism 28 and the third collimator lens 32 on the projecting light optical axis 27.

Figure 2:
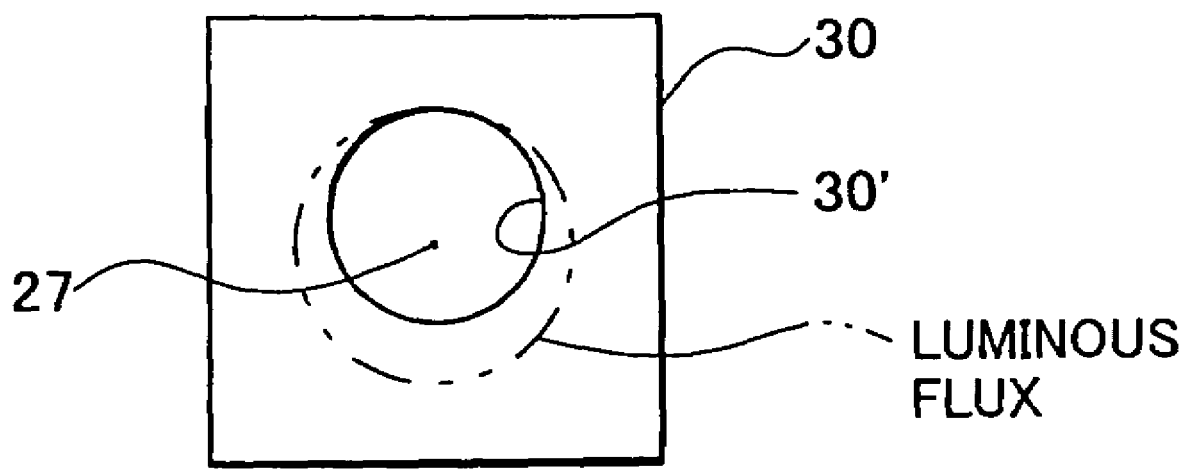
FIG. 2 is an arrow diagram seen from A in FIG. 1.

As seen in FIG. 2, the mask 30 has a transmission hole 30' decentered with respect to the projecting light optical axis 27 so that a part of the distance-measuring light projected from the optical fiber 31 is intercepted. In FIG. 2, the transmission hole 30' is designed in circular shape, while the transmission hole 30' may be in rectangular shape or in elliptical shape or in circular shape with a partially lacking portion, etc. It may be designed in such manner that a graphic gravity center of the transmission hole 30' is decentered with respect to the projecting light optical axis 27 and that a luminous flux of the distance-measuring light on the projecting light optical axis 27 can pass through.

Under the condition that the optical path switching means 24 selects the second optical path 26, the rhombic prism 28 is deviated from the optical axis 20. The distance-measuring light from the mixing means 23 is converged by the second collimator lens 29. Then, the distance-measuring light enters the optical fiber 31 through an incident end of the optical fiber 31. The distance-measuring light projected from the optical fiber 31 is turned to a parallel luminous flux by the third collimator lens 32, which are then projected along the projecting light optical axis 27.

The light source unit 15 has a pointer light source 33. An LD is used as the pointer light source 33. It emits a visible pointer laser beam, and the pointer laser beam is turned to a parallel luminous flux by a fourth collimator lens 34. The pointer laser beam is projected toward an object to be measured (not shown) by the projecting optical system 16.

Now, description will be given on the projecting optical system 16.

On the projecting light optical axis 27, there are provided a beam splitter 35, a concave lens 36, a first optical path deflection member 37, a second optical path deflection member 38, and an objective lens 39. A projecting light amount adjusting means 41 is arranged between the beam splitter 35 and the concave lens 36. The second optical path deflection member 38 has its graphic gravity center decentered with respect to the projecting light optical axis 27. The second optical path deflection member 38 has a size large enough to reflect the distance-measuring light, which enters via the mask 30.

The second optical path deflection member 38 is decentered upward with respect to the projecting light optical axis 27 as shown in FIG. 1, for instance. The luminous flux of the distance-measuring light reflected by the second optical path deflection member 38 is also decentered upward with respect to the projecting light optical axis 27.

The projecting light amount adjusting means 41 comprises a light amount adjusting plate 43, which has transmission light amount continuously changing in a circumferential direction, and which is rotated by a light amount adjusting motor 42 such as a stepping motor or the like having a positioning function. The light amount adjusting plate 43 is provided to intercept the projecting light optical axis 27.

The concave lens 36 is arranged in such manner that a focusing position of the concave lens 36 is aligned with a focusing position of the objective lens 39. Together with the objective lens 39, it makes up a beam expander so that the parallel luminous flux guided to the concave lens 36 are spread and projected. In this respect, influences by optical elements such as the beam splitter 35, the light amount adjusting plate 43, etc. can be minimized. Compared with a structure where the laser light source 21 is arranged at the focusing position of the objective lens 39, light projecting efficiency is improved.

The beam splitter 35 transmits nearly all of the distance-measuring light (infrared light) from the laser light source 21 and reflects a part of the light. The beam splitter 35 also totally reflects the pointer laser beam (visible light) from the pointer light source 33. The first optical path deflection member 37 is a mirror, etc., and the second optical path deflection member 38 is a mirror or a dichroic mirror, etc. to reflect the distance-measuring light. The second optical path deflection member 38 totally reflects the distance-measuring light. The second optical path deflection member 38 partially reflects the pointer laser beam (visible light) and partially transmits the pointer laser beam.

Now, description will be given on the internal reference optical system 17.

The internal reference optical system 17 is provided between the light source unit 15 and the photodetection optical system 18 as to be described later. The internal reference optical system 17 has an internal reference optical axis 44 aligned with a transmission light optical axis of the beam splitter 35. On the internal reference optical axis 44, there are provided a condenser lens 45, a density filter 46, and a dichroic prism 47.

A chopper means 48 is provided so as to span between the projecting light optical axis 27 and the internal reference optical axis 44. The chopper means 48 has a chopper plate 49 for intercepting the projecting optical axis 27 and the internal reference optical axis 44 and a chopper motor 51, which can rotate the chopper plate 49 and determine a position of the chopper plate 49. Under the condition that the chopper plate 49 intercepts the projecting light optical axis 27, the internal reference optical axis 44 is open to pass through. Under the condition that the chopper plate 49 intercepts the internal reference optical axis 44, the projecting light optical axis 27 is open to pass through.

By rotating the chopper plate 49, it can be alternatively selected whether the distance-measuring light from the light source unit 15 is projected along the projecting light optical axis 27 or it is projected to the internal reference optical axis 44 as an internal reference light.

The density filter 46 is to adjust light intensity of the internal reference light so that light intensity of the distance-measuring light reflected from the object to be measured would be approximately equal to the light intensity of the internal reference light.

Now, the photodetection optical system 18 will be described.

The photodetection optical system 18 has a photodetection optical axis 52, which is aligned with an extension of the internal reference optical axis 44. On the photodetection optical axis 52, there are provided the dichroic prism 47, a doughnut lens 53, a photodetection fiber 54, a fifth collimator lens 55, an interference filter 56, a condenser lens 57, and a photodetection element 58. As the photodetection element 58, an avalanche photodiode (APD) is used, for instance. The interference filter 56 has such a characteristic as to transmit a light of narrow band, e.g. a light in wavelength range near 800 nm. When the photodetection element 58 receives a reflected distance-measuring light, a photodetection signal is sent to an arithmetic operation unit 65. At the arithmetic operation unit 65, a distance to the object to be measured is calculated based on the photodetection signal.

Description will be given now on the ocular optical system 19.

The ocular optical system 19 has an ocular optical axis 60. The ocular optical axis 60 is aligned with an extension of the optical axis of the objective lens 39, which passes through the dichroic prism 47. On the ocular optical axis 60, there are provided a focusing lens 61 movably arranged along the ocular optical axis 60, an erect prism 62 for converting an image to an erect image, a collimation plate 63 with a collimation line such as a cross, and an ocular lens 64.

Now, description will be given on operation.

First, the pointer light source 33 is turned on, and a laser beam for pointer is emitted. The pointer laser beam is reflected by the beam splitter 35. Then, the pointer laser beam is projected via the first optical path deflection member 37 and the second optical path deflection member 38 toward the object to be measured through the ocular lens 39. The pointer laser beam is projected coaxially with the projecting light optical axis 27, and the pointer laser beam is accurately projected to a measuring point. A projecting point of the pointer laser beam is observed by the ocular optical system 19, and a measuring point is determined. When the measuring point is determined, the pointer light source 33 is turned off.

The pointer light source 33 is turned on only when necessary. As a result, chances are reduced to project the laser light to eyes of an operator or a passer-by at a working place. This eliminates the possibility to give uncomfortableness to the operator or the passer-by or to make them feel dizziness.

When non-prism distance measurement is performed by using a wall surface of a building as the object to be measured, non-prism measurement is selected.

When the non-prism measurement is selected, the rhombic prism 28 is positioned to intercept the second optical path 26 and the projecting light optical axis 27. The distance-measuring light emitted from the laser light source 21 is mixed by the mixing means 23. After being mixed, light amount speckles is eliminated, and measurement accuracy is increased. By the rhombic prism 28, the optical path is deflected toward the first optical path 25. The distance-measuring light passes through the beam splitter 35 and is projected to the object to be measured by the projecting optical system 16.

A beam diameter and a spreading angle of the projected distance-measuring light depend upon the size of the light source. A light emitting point of the laser light source 21 is about 3 μm in diameter in case of a semiconductor laser (LD), and a distance-measuring light with a small diameter is projected.

The distance-measuring light is projected from the projecting optical system 16 to the object to be measured. The distance-measuring light reflected by the object to be measured has generally a reflection surface, which is not in form of a mirror surface or a surface similar to mirror surface, and the light is diffused. The reflected distance-measuring light passes through the projecting light optical axis 27 and enters the objective lens 39. Then, the reflected distance-measuring light is converged by the objective lens 39, enters the dichroic prism 47 and is further reflected by the dichroic prism 47. The luminous flux of the reflected distance-measuring light entering the dichroic prism 47 is sufficiently larger than the second optical path deflection member 38.

Due to the arrangement of the projecting optical system 16, such as the positioning of the second optical path deflection member 38 on the projecting light optical axis 27, the reflected distance-measuring light guided to the photodetection optical system 18 is a luminous flux, which lacks the central portion. For this reason, when the object to be measured is at near distance, it happens sometimes that the lacking portion of the luminous flux of the reflected distance-measuring light agree with an incident end surface of the photodetection fiber 54 and the reflected distance-measuring light does not enter the photodetection optical system 18. The doughnut lens 53 is used to refract the luminous flux in the periphery of the reflected distance-measuring light and to make it enter the photodetection fiber 54. As a result, regardless of whether the measuring distance is far or near, the reflected distance-measuring light is guided toward the photodetection optical system 18.

When the reflected distance-measuring light enters the photodetection fiber 54 and is guided to the fifth collimator lens 55 by the photodetection fiber 54, it is turned to a parallel luminous flux by the fifth collimator lens 55. Disturbance light is cut off by the interference filter 56, and the luminous flux is converged to the photodetection element 58 by the condenser lens 57. The photodetection element 58 receives a distance-measuring light with a higher S/N ratio.

The light amount adjusting motor 42 rotates the light amount adjusting plate 43 according to the distance measurement and adjusts the intensity of the projected distance-measuring light by the light amount adjusting plate 43. Regardless of the distance to the object to be measured, intensity of the reflected distance-measuring light received by the photodetection element 58 is adjusted to a constant value. The chopper means 48 switches whether the distance-measuring light should be projected to the object to be measured or to the photodetection optical system 18 as the internal reference light. The density filter 46 adjusts light intensity of the internal reference light so that the intensity of the internal reference light is approximately equal to the light intensity of the reflected distance-measuring light.

The photodetection element 58 transmits photodetection signals of the reflected distance-measuring light and the internal reference light to the arithmetic operation unit 65, and the arithmetic operation unit 65 calculates a distance to the object to be measured according to the photodetection signals from the photodetection element 58. As described above, disturbance light except the light of wavelength range of the reflected distance-measuring light is removed by the interference filter 56. As a result, the reflected distance-measuring light received by the photodetection element 58 has a higher S/N ratio, and this makes it possible to measure the distance with high accuracy.

In the prism measurement, for the purpose of reducing the error caused by deviation of a visual axis of a telescope from the distance-measuring optical axis, a luminous flux with a larger spreading angle is projected.

When the prism measurement is selected, the rhombic prism 28 is placed at a position deviated from the second optical path 26 and the projecting light optical axis 27. The distance-measuring light emitted from the laser light source 21 is mixed by the mixing means 23. By the mixing, light amount speckles is eliminated, and measurement accuracy is improved.

The distance-measuring light is converged to and enters an incident end surface of the optical fiber 31 by the second collimator lens 29. An exit end surface of the optical fiber 31 is positioned on the projecting light optical axis 27. The distance-measuring light projected from the optical fiber 31 is converged by the third collimator lens 32, passes through the mask 30 and the beam splitter 35 and is projected to the object to be measured (a retroreflection prism such as a corner cube) by the projecting optical system 16. After passing though the mask 30, a part of the distance-measuring light is shut off, and the luminous flux of the distance-measuring light is decentered with respect to the projecting light optical axis 27 (decentered upward in FIG. 1).

As described above, a beam diameter and a spreading angle of the projected distance-measuring light depend on the size of the light source. In the prism measurement, the exit end surface of the optical fiber 31 acts as a secondary light source. The end surface of the optical fiber 31 is 300 μm in diameter. This is sufficiently larger than the diameter 3 μm of the semiconductor laser (LD) in the non-prism measurement as described above. Thus, a distance-measuring light with a larger spreading angle is projected.

In the prism measurement, the conditions for the measurement with high accuracy include a larger spreading angle and an uniform distance-measuring light. The projected distance-measuring light is mixed by the mixing means 23 and is turned to multi-mode by multiple reflections when it passes through the optical fiber 31. Thus, speckles caused by coherence of the laser beam can be prevented and the light amount speckles can be eliminated.

After being reflected by the object to be measured, the luminous flux of the distance-measuring light is decentered downward in FIG. 1. Then, the distance-measuring light enters the objective lens 39 via the projecting light optical axis 27, and the distance-measuring light is converged by the objective lens 39.

After passing through the objective lens 39, a part of the reflected distance-measuring light is intercepted by the second optical path deflection member 38. The luminous flux of the distance-measuring light is decentered downward, and, further, the second optical path deflection member 38 is decentered upward. As a result, the part of the reflected distance-measuring light not intercepted by the second optical path deflection member 38 enters the dichroic prism 47.

After being reflected by the dichroic prism 47, the reflected distance-measuring light enters the photodetection fiber 54. By the photodetection fiber 54, the reflected distance-measuring light is guided to the fifth collimator lens 55. Then, it is turned to a parallel luminous flux by the fifth collimator lens 55. Disturbance light is cut off by the interference filter 56. The luminous flux is converged by the condenser lens 57 and is received by the photodetection element 58.

Also, in the distance measurement by using the prism measurement, disturbance light is cut off by the interference filter 56, and an S/N ratio is increased. The reflected distance-measuring light entering the interference filter 56 is turned to normal incident light by the fifth collimator lens 55, and reduction of the light amount of the reflected distance-measuring light due to the interference filter 56 is prevented. These are the same as in the non-prism measurement.

Figure 3A:
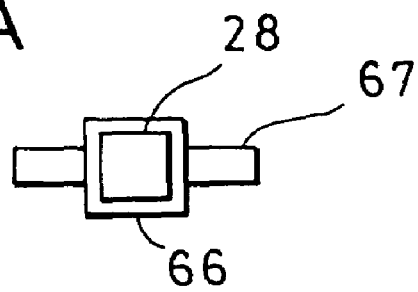
FIG. 3 represents drawings each showing an essential portion of optical path switching means used in the embodiment of FIG. 1.
Figure 3B:
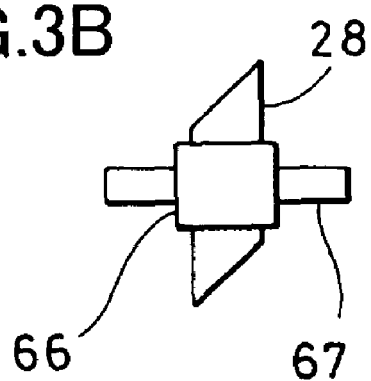
Figure 3C:
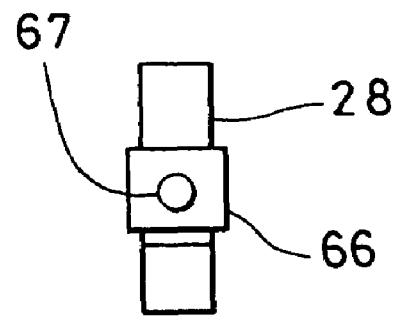

Referring to FIG. 3, description will be given on the optical path switching means 24.

The rhombic prism 28 is held by a prism holder 66. A rotation shaft 67 is protruded from the prism holder 66, and the rhombic prism 28 is rotatably supported via the rotation shaft 67. A motor (not shown) and an actuator (not shown) such as, solenoid, etc. are connected with the rotation shaft 67, and the rhombic prism 28 is rotated at a predetermined angle by the actuator so as to be insertable to and removable from the second optical path 26 or the projection light optical axis 27.

Figure 4:
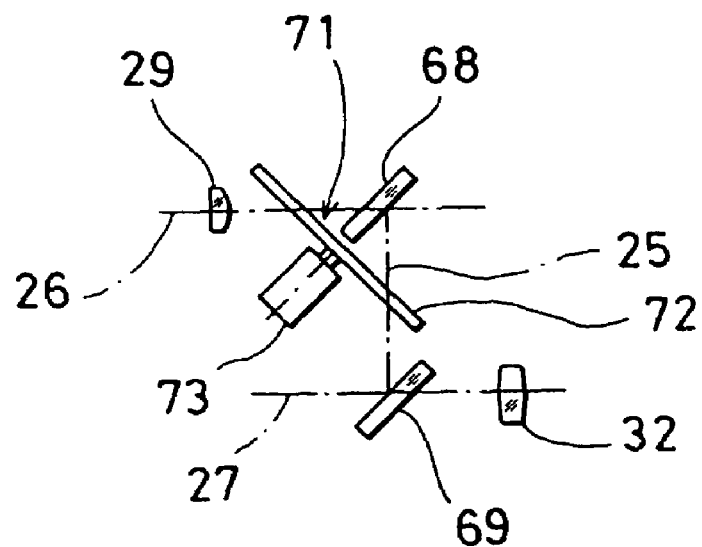
FIG. 4 is a drawing to explain another type of optical path switching means.

FIG. 4 shows another type of optical path switching means 24.

In FIG. 4, the same component as in FIG. 1 is referred by the same symbol.

A first half-mirror 68 is arranged as a beam splitter on the second optical path 26, and a second half-mirror 69 is provided as a beam splitter on the projecting light optical axis 27. The first half-mirror 68 and the second half-mirror 69 are arranged at opposed positions and in parallel to each other and are mechanically fixed on a housing or the like of the distance-measuring system. By setting the second optical path 26 and the projecting light optical axis 27 to parallel to each other, the first optical path 25 is formed between the first half-mirror 68 and the second half-mirror 69. The distance-measuring light reflected by the first half-mirror 68 and reflected by the second half-mirror 69 after passing through the first optical path 25 runs along the projecting light optical axis 27 and is projected by the projecting optical system 16. A luminous flux switcher 71 is spanned between the second optical path 26 and the first optical path 25. The luminous flux switcher 71 comprises a luminous flux switching plate 72 having a transmission hole (not shown) and a motor 73 for rotating the luminous flux switching plate 72. The luminous flux switching plate 72 intercepts the first optical path 25 when the second optical path 26 is opened, and it intercepts the second optical path 26 when the first optical path 25 is opened.

The luminous flux switcher 71 guides the distance-measuring light passing through the first half-mirror 68 to the optical fiber 31. The luminous flux switcher 71 also guides the distance-measuring light reflected by the first half-mirror 68 toward the projecting optical system 16 via the second half-mirror 69.

The mask 30 may be provided on the projecting light optical axis 27. In this case, a part of the distance-measuring light is shut off not only in the prism measurement but also in the non-prism measurement. In case of the non-prism measurement, the reflected distance-measuring light is a diffused light. Thus, even when a part of the reflected distance-measuring light is shut off, sufficient light amount can be obtained, and no trouble occurs in the measurement.

Figure 5:
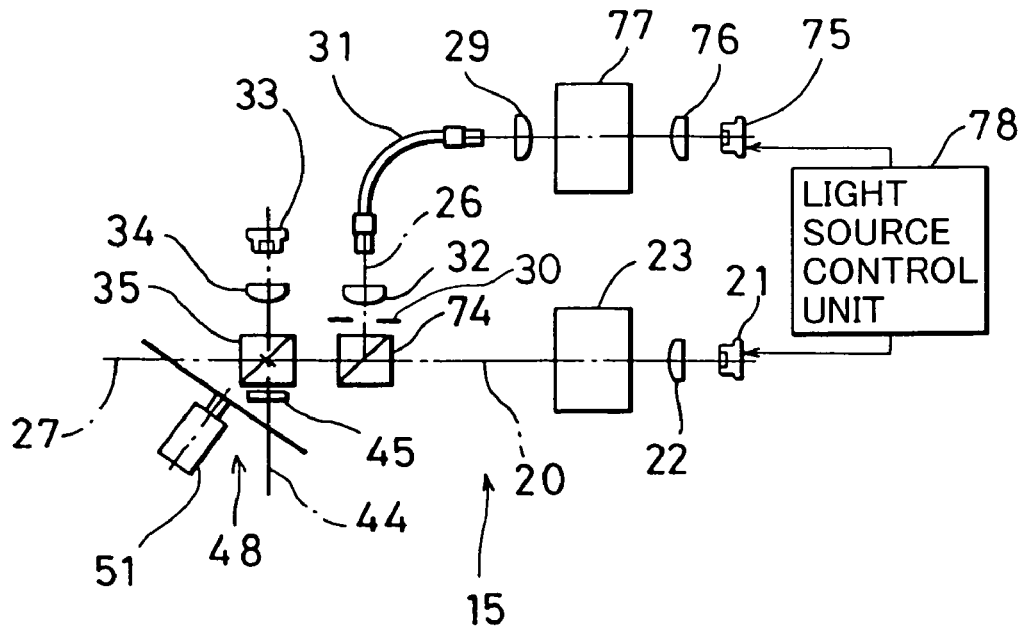
FIG. 5 is a schematical block diagram of a light source unit of a second embodiment of the invention.
Figure 6:
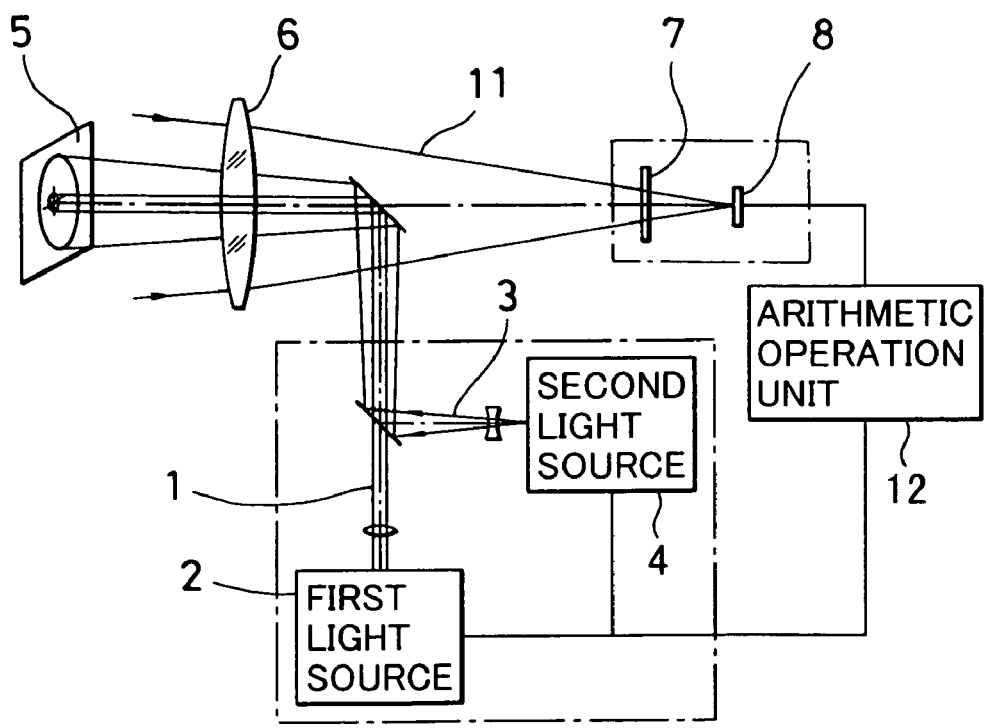
FIG. 6 is a drawing to explain a conventional example.

FIG. 5 shows a second embodiment of the present invention.

In the second embodiment, such a case is shown that a light source for the prism measurement and a light source for the non-prism measurement are provided separately from each other. FIG. 5 shows a light source unit 15, and the other arrangement is the same as shown in FIG. 1, and detailed description is not given here.

On an optical axis 20, there are provided a laser light source 21 as a light source for non-prism measurement, a first collimator lens 22, a mixing means 23, and a beam splitter 74. On a second optical path 26 perpendicularly crossing the optical axis 20 at the beam splitter 74, there are provided an auxiliary laser light source 75, an auxiliary first collimator lens 76, an auxiliary mixing means 77, a second collimator lens 29, an optical fiber 31, and a third collimator lens 32. It is designed in such manner that an auxiliary distance-measuring light emitted from the auxiliary laser light source 75 enters the beam splitter 74.

In the second embodiment, a mask 30 is provided between the third collimator lens 32 and the beam splitter 74 on the second optical path 26. As the auxiliary laser light source 75, an LD with the same specification as that of the laser light source 21 is used. The mask 30 may be arranged on the projecting light optical axis 27.

In the laser light source 21 and the auxiliary laser light source 75, light emission, flashing, etc. are controlled by a light source control unit 78.

When the non-prism measurement is carried out, the laser light source 21 is turned on, and the auxiliary laser light source 75 is turned off. A distance-measuring light from the laser light source 21 is converged by the first collimator lens 22 and is mixed by the mixing means 23. Then, the distance-measuring light passes through the beam splitter 74 and is projected along the projecting light optical axis 27. Or, the optical path is switched over by the chopper means 48, and the distance-measuring light is guided to the photodetection optical system 18 (not shown) via the internal reference optical axis 44 (See FIG. 1). As described above, a diameter of a light emitting point of the laser light source 21 is small, and a distance-measuring light suitable for the non-prism measurement can be obtained.

When the prism measurement is carried out, the auxiliary laser light source 75 is turned on, and the laser light source 21 is turned off. An auxiliary distance-measuring light is converged by the auxiliary first collimator lens 76 and is mixed by the auxiliary mixing means 77. Then, the light is converged to an incident end surface of the optical fiber 31 via the second collimator lens 29. After passing through the optical fiber 31, the auxiliary distance-measuring light is turned to a parallel luminous flux by the third collimator lens 32. Then, the luminous flux is reflected by the beam splitter 74 and is projected via the projecting light optical axis 27. Or, the optical path is switched over by the chopper means 48, and the auxiliary distance-measuring light is guided to the photodetection optical system 18 (not shown) via the internal reference optical axis 44 (See FIG. 1).

In case of the prism measurement, an exit end surface of the optical fiber 31 acts as a secondary light source. Because the exit end surface of the optical fiber 31 has a diameter of 300 μm, an auxiliary distance-measuring light with a large spreading angle suitable for the prism measurement can be obtained. The auxiliary distance-measuring light is turned to multi-mode by the optical fiber 31. As a result, an uniform auxiliary distance-measuring light without light amount speckles is projected. The effect of the mask 30 is the same as in the first embodiment.

Regarding reflectivity and transmissivity of the beam splitter 74, the light amount may be lesser in the prism measurement than in the non-prism measurement. Thus, transmissivity of the distance-measuring light may be set higher, and reflectivity of the auxiliary distance-measuring light may be set lower.

In the second embodiment, the auxiliary laser light source 75 and the laser light source 21 can be switched over by the light source control unit 78, and the optical path switching means 24 as shown in the first embodiment may not be used. There is an individual difference between the laser light source 21 and the auxiliary laser light source 75 at the time of production, and it is not possible to emit distance-measuring lights of completely the same wavelength. However, the difference is an error of such order as included in transmission wavelength range of the interference filter 56 (See FIG. 1). There is practically no trouble, and a distance-measuring light having substantially the same wavelength can be emitted. An S/N ratio as high as that of the first embodiment can be obtained, and measurement accuracy can be maintained at high level.

In the second embodiment, the mixing means 23 may not be used.

The present invention provides a distance-measuring system, which comprises a light source unit for emitting a distance-measuring light, a photodetection optical system having a photodetection optical axis, a projecting optical system having a projecting light optical axis and for projecting the distance-measuring light from the light source unit to an object to be measured and for guiding the distance-measuring light reflected from the object to be measured toward the photodetection optical system, and an internal reference optical system for guiding the distance-measuring light from the light source unit to the photodetection optical system as an internal reference light, wherein the light source unit can emit two distance-measuring lights with different spreading angles, and one of the light source unit and the projection optical system has a decentering member for decentering the distance-measuring light with respect to the projecting light optical axis. As a result, even when the object to be measured is at near distance or at remote distance, and regardless of whether it is non-prism measurement or prism measurement, distance measurement can be carried out, and this facilitates the designing of a system with simple structure.

What is claimed is:

1. A distance-measuring system, comprising a light source unit, one projecting optical system having a projecting light optical axis and for projecting distance-measuring light from said light source unit to an object to be measured, a photodetection optical system having a photodetection optical axis and for receiving a distance-measuring light reflected from the object to be measured, and an internal reference optical system for guiding the distance-measuring light from the light source unit to said photodetection optical system as an internal reference light, wherein said light source unit comprises one light source for emitting the distance-measuring light, a first optical path for projecting the distance-measuring light from said light source with a larger spreading angle toward the object to be measured, a second optical path for projecting the distance-measuring light from said light source with a smaller spreading angle toward the object to be measured, an optical fiber arranged on one of the optical paths of said first optical path and said second optical path, and an optical path switching means for guiding the distance-measuring light selectively toward one of the optical paths of said first optical path and said second optical path, and wherein one of said light source unit and said projection optical system has a decentering member for decentering the distance-measuring light with respect to the projecting light optical axis.

2. A distance-measuring system according to claim 1, wherein said optical fiber is arranged on said first optical path.

3. A distance-measuring system according to claim 1, wherein said projecting optical system comprises an optical path deflecting member for deflecting the distance-measuring light toward the direction of said object to be measured and for decentering the distance-measuring light with respect to the projecting light optical axis, wherein said projecting optical system guides said reflected distance-measuring light entering with decentered in the direction opposite to the projected distance-measuring light.

4. A distance-measuring system according to claim 1, wherein said decentering member is a mask having a hole decentered with respect to the optical axis and decenters the distance-measuring light from the optical axis by allowing the distance-measuring light to pass through the hole.

5. A distance-measuring system according to claim 4, wherein said mask is provided on said first optical path with a larger spreading angle.

6. A distance-measuring system according to claim 4, wherein said mask is provided on a common optical path for two distance-measuring lights.

7. A distance-measuring system according to claim 1, wherein said optical path switching means is a rhombic prism which is provided so as to span between the first optical path and the second optical path, and optical paths can be switched over by inserting or removing the rhombic prism to or from the first optical path and the second optical path.

8. A distance-measuring system according to claim 1, wherein said photodetection optical system comprises a doughnut lens for converging the reflected distance-measuring light deviated from the photodetection optical axis to the photodetection optical axis.

* * * * *